United States Patent
Akiba et al.

(10) Patent No.: US 10,897,884 B2
(45) Date of Patent: Jan. 26, 2021

(54) FISHING LINE GUIDE, FISHING ROD HAVING THE FISHING LINE GUIDE, AND GUIDE RING FOR USE IN THE FISHING LINE GUIDE

(71) Applicant: GLOBERIDE, Inc., Tokyo (JP)

(72) Inventors: Masaru Akiba, Tokyo (JP); Masayuki Watanabe, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 226 days.

(21) Appl. No.: 16/080,526

(22) PCT Filed: Oct. 21, 2016

(86) PCT No.: PCT/JP2016/081223
§ 371 (c)(1),
(2) Date: Aug. 28, 2018

(87) PCT Pub. No.: WO2017/149832
PCT Pub. Date: Sep. 8, 2017

(65) Prior Publication Data
US 2019/0008129 A1    Jan. 10, 2019

(30) Foreign Application Priority Data

Feb. 29, 2016    (JP) ................... 2016-038082

(51) Int. Cl.
*A01K 87/04*    (2006.01)
*A01K 87/02*    (2006.01)
*F16B 11/00*    (2006.01)

(52) U.S. Cl.
CPC .............. *A01K 87/04* (2013.01); *A01K 87/02* (2013.01); *F16B 11/006* (2013.01)

(58) Field of Classification Search
CPC ..................................................... A01K 87/04
(Continued)

(56) References Cited

U.S. PATENT DOCUMENTS 2,502,845 A * 4/1950 Hoffman ................ A01K 87/04
43/24
3,171,228 A * 3/1965 Cwik ..................... A01K 87/04
43/24

(Continued)

FOREIGN PATENT DOCUMENTS

AU    199894095 A1    6/1999
EP    2 236 026 A1    10/2010
(Continued)

OTHER PUBLICATIONS

International Preliminary Report on Patentability dated Jun. 15, 2018 issued in corresponding International Patent Application No. PCT/JP2016/081223 with English translation.
(Continued)

*Primary Examiner* — David J Parsley
(74) *Attorney, Agent, or Firm* — DLA Piper LLP (US)

(57) ABSTRACT

One object of the present invention is to provide a guide ring less prone to break due to an impact or wear. A fishing line guide according to one aspect of the present invention is to be used on a fishing rod and includes a guide body with a through hole formed therein and a guide ring fitted into the through hole of the guide body. The guide ring has a top portion that is most distant from the fishing rod in a vertical direction extending vertically with respect to an axial direction of the fishing rod, and the guide ring is configured such that a thickness of a guide rear portion on a rear side relative to the top portion is larger than that of a guide front portion on a front side relative to the top portion.

7 Claims, 7 Drawing Sheets

(58) Field of Classification Search
USPC .......................................................... 43/24
See application file for complete search history.

(56) References Cited

U.S. PATENT DOCUMENTS

| | | | |
|---|---|---|---|
| 5,802,759 A * | 9/1998 | Ohmura | A01K 87/04 43/24 |
| 5,901,492 A * | 5/1999 | Ohmura | A01K 87/04 43/24 |
| 5,941,013 A * | 8/1999 | Ohmura | A01K 87/04 43/24 |
| 6,067,743 A | 5/2000 | Ohmura | |
| 2014/0373427 A1 | 12/2014 | Watanabe et al. | |
| 2015/0089857 A1 | 4/2015 | Akiba | |
| 2015/0201595 A1 | 7/2015 | Takenouchi et al. | |

FOREIGN PATENT DOCUMENTS

| | | |
|---|---|---|
| JP | 10-136839 A | 5/1998 |
| JP | 11-155429 A | 6/1999 |
| JP | 2003-274810 A | 9/2003 |
| JP | 2012-075375 A | 4/2012 |
| JP | 2012-095628 A | 5/2012 |
| JP | 2012-110287 A | 6/2012 |
| JP | 2015-065911 A | 4/2015 |
| WO | 2013/073597 A1 | 5/2013 |
| WO | 2014/119522 A1 | 8/2014 |

OTHER PUBLICATIONS

The Extended Eureopean Search Report dated Sep. 19, 2019, of counterpart European Application No. 16892668.1.
International Search Report PCT/JP2016/081223 dated Nov. 15, 2016 with English translation.
Notice of Reasons for Refusal dated Jul. 7, 2020, of counterpart Japanese Patent Application No. 2018-502513, along with an English translation.

* cited by examiner

FISHING LINE GUIDE, FISHING ROD HAVING THE FISHING LINE GUIDE, AND GUIDE RING FOR USE IN THE FISHING LINE GUIDE

CROSS-REFERENCE TO RELATED APPLICATIONS

This application is the U.S. National Phase Application of PCT/JP2016/081223, filed Oct. 21, 2016, which is based on and claims the benefit of priority from Japanese Patent Application Serial No. 2016-038082, (filed on Feb. 29, 2016. The contents of each is incorporated herein by reference in entirety. The present invention relates to a fishing line guide, a fishing rod having the fishing line guide, and a guide ring for use in the fishing line guide.

TECHNICAL FIELD

Background

A conventional fishing rod has a plurality of fishing line guides provided on an outer peripheral surface of a rod element thereof in order to guide a fishing line being reeled out or in along the rod element. A conventional fishing line guide typically includes a flat plate-shaped frame and a guide ring fitted in a mounting hole of the frame.

The guide ring is made of a hard material such as ceramic such that it does not wear easily due to contact with the fishing line. Ceramic guide rings are disclosed in, for example, Japanese Patent Application Publication No. Hei 10-136839 (Patent Literature 1), Japanese Patent Application Publication No. Hei 11-155429 (Patent Literature 2), and International Publication No. WO 2014/119522 (Patent Literature 3). Ceramic guide rings, however, have a disadvantage of being vulnerable to an impact. In particular, ceramic guide rings are prone to break when subjected to a large impact.

Guide rings made of metal are also known. Metal guide rings are disclosed in, for example, Japanese Patent Application Publication No. 2012-110287 (Patent Literature 4) and Japanese Patent Application Publication No. 2015-65911 (Patent Literature 5). Metal guide rings, however, have a lower hardness than ceramic guide rings and thus are prone to wear easily due to friction against the fishing line. Metal guide rings are required to have impact resistance, as do the ceramic guide rings.

RELEVANT REFERENCES

List of Relevant Patent Literatures

Patent Literature 1: Japanese Patent Application Publication No. Hei 10-136839
Patent Literature 2: Japanese Patent Application Publication No. Hei 11-155429
Patent Literature 3: International Publication No. WO 2014/119522
Patent Literature 4: Japanese Patent Application Publication No. 2012-110287
Patent Literature 5: Japanese Patent Application Publication No. 2015-65911

SUMMARY

A guide ring for use in a fishing line guide is required to be less prone to break due to an impact or wear. One object of the present invention is to provide a guide ring less prone to break due to an impact or wear, a fishing line guide having such a guide ring, and a fishing rod having such a fishing line guide. The other objects of the present disclosure will be apparent with reference to the entire description in this specification.

A fishing line guide according to one aspect of the present invention is to be used on a fishing rod and includes a guide body with a through hole formed therein and a guide ring fitted into the through hole of the guide body. The guide ring has a top portion that is most distant from the fishing rod in a vertical direction extending vertically with respect to an axial direction of the fishing rod, and the guide ring is configured such that a thickness of a guide rear portion on a rear side relative to the top portion is larger than that of a guide front portion on a front side relative to the top portion. In one aspect of the present invention, the guide ring is configured such that the thickness of the guide rear portion is larger than that of the top portion. The thicknesses of the portions of the guide ring herein refer to the thicknesses of the guide ring as viewed in a cross section cut along a plane including an axial direction of the guide ring, or refer to other thicknesses in conformity to the purport of the present invention.

Typically, at the time of casting the fishing rod or winding the fishing line, the fishing line makes contact with an inner peripheral surface of the guide ring. The Applicant noticed that the fishing line reeled out in casting applies a large impact to the guide ring. The fishing line reeled out in casting moves forward in a spiral or wavy form, not in a straight form. Therefore, the fishing line reeled out in casting collides against a rear portion of the guide ring at a high speed. Accordingly, the rear portion of the guide ring tends to be subjected to a large impact in casting. On the other hand, the front portion of the guide ring is unlikely to be subjected to a large impact.

The guide ring according to the above aspect is configured such that a thickness of a guide rear portion on a rear side relative to the top portion is larger than that of a guide front portion on a front side relative to the top portion, resulting in a high impact resistance in the guide rear portion. Therefore, the guide ring is less prone to be broken due to collision against the fishing line in casting.

In one aspect of the present invention, the guide ring of the fishing line guide is configured such that the thickness of the top portion is larger than that of the guide front portion.

In winding the fishing line, the guide ring comes into contact with the fishing line in the vicinity of the top portion of the inner peripheral surface of the guide ring. Therefore, in winding the fishing line, the inner peripheral surface of the guide ring is most susceptible to wear in the vicinity of the top portion. According to the above aspect, the top portion of the guide ring susceptible to wear has a larger thickness than the guide front portion less susceptible to wear, and thus the guide ring is less prone to be broken due to wear.

In one aspect of the present invention, the guide ring is curved so as to come in contact at a front end surface thereof with the inner peripheral surface of the through hole of the guide body.

According to this aspect, since the guide ring comes in contact at the front end surface thereof with the guide body, a contact area between the guide ring and the guide body is small. Therefore, the guide ring can be readily mounted to the guide body.

In one aspect of the present invention, the guide ring is curved so that a front surface of a rear edge portion thereof comes in contact with a rear surface of the guide body.

According to this aspect, the guide ring can be supported not only by the inner peripheral surface of the through hole of the guide body but also by the rear surface of the guide body. Thus, the guide ring can be more stably supported.

In one aspect of the present invention, the guide ring is curved so that a gap is formed between an outer peripheral surface of the guide ring and the guide body, and an adhesive is applied in the gap.

According to this aspect, it is possible to reduce a stress exerted on the guide ring when the guide ring is fitted into the guide body, and after the guide ring is fitted into the guide body, it is possible to stably retain the guide ring by use of an adhesive.

A fishing rod according to one aspect of the present invention is provided with at least one fishing line guide according to any of the above-mentioned aspects.

The guide ring according to one aspect of the present invention is a guide ring for use in a fishing line guide to be mounted to a fishing rod. The guide ring has a top portion that is most distant from the fishing rod in a vertical direction extending vertically with respect to an axial direction of the fishing rod, and the guide ring is configured such that a thickness of a guide rear portion on a rear side relative to the top portion is larger than that of a guide front portion on a front side relative to the top portion.

ADVANTAGES

Various embodiments of the present invention provide a guide ring less prone to break due to an impact or wear, a fishing line guide having such a guide ring, and a fishing rod having such a fishing line guide.

DESCRIPTION OF THE EMBODIMENTS

Various embodiments of the invention will be described hereinafter with reference to the drawings. In the drawings, like elements are denoted by like reference numerals throughout. It should be noted that the drawings do not necessarily appear to an accurate scale, for convenience of description.

Figure 1:
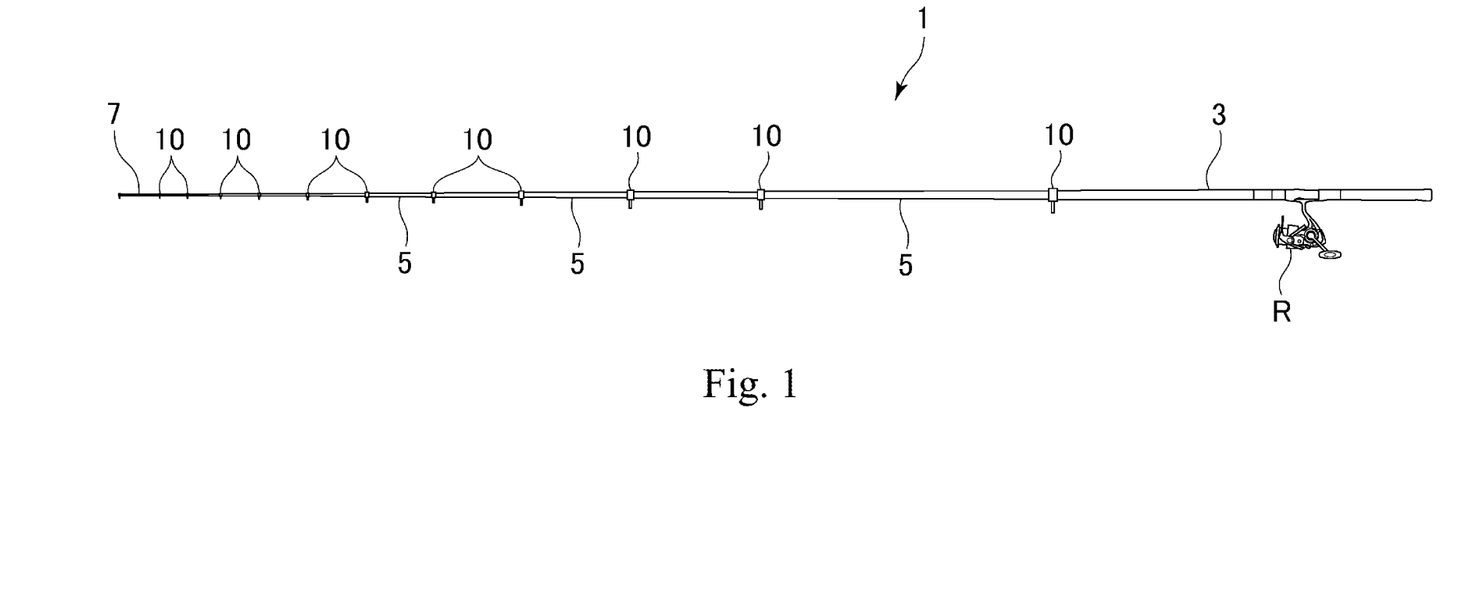
FIG. 1 is a side view schematically showing a configuration of a fishing rod according to one embodiment of the present invention.

FIG. 1 is an external view of a fishing rod 1 according to one embodiment of the invention, the fishing rod 1 having a fishing line guide 10 according to one embodiment of the present invention. In the embodiment shown, the fishing rod 1 is a telescopic fishing rod having a butt rod section 3, a plurality of intermediate rod sections 5 (constituted by three ones in the example shown in FIG. 1), and a tip rod section 7. When the fishing rod 1 is not in use, the intermediate rod sections 5 and the tip rod section 7 are housed in the hollow butt rod section 3.

The butt rod section 3, the intermediate rod sections 5, and the tip rod section 7 each can be formed by using, for example, a prepreg sheet made of carbon fibers impregnated with a synthetic resin. Furthermore, the butt rod section 3, the intermediate rod sections 5, and the tip rod section 7 each have a tapered shape tapered toward the tip. On outer peripheral surfaces of the intermediate rod sections 5 and the tip rod section 7, there are provided a plurality of fishing line guides 10 that guide a fishing line released from a reel R, to the tip of the fishing rod 1.

Figure 2:
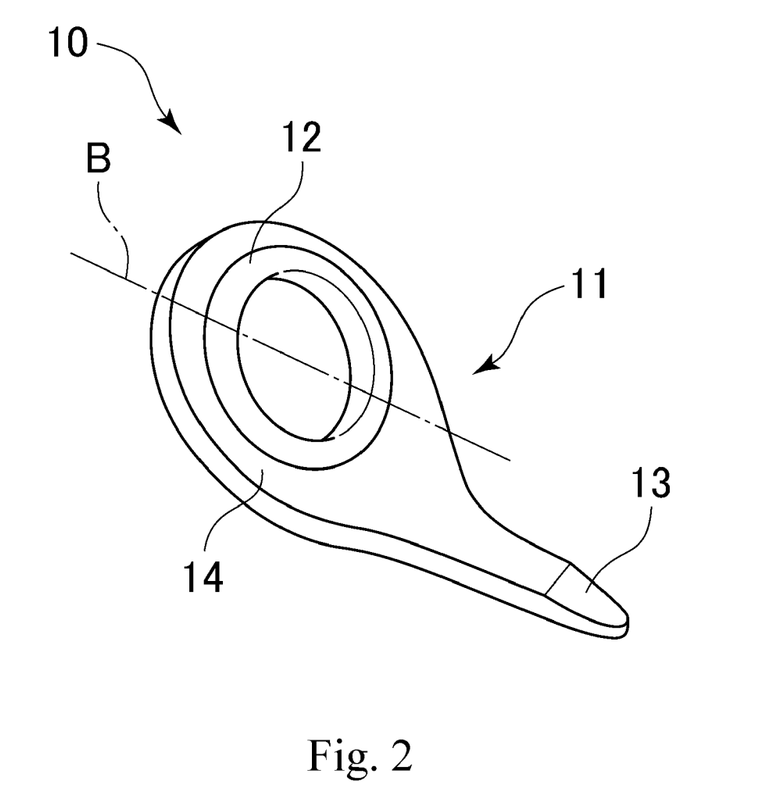
FIG. 2 is a perspective view of a fishing line guide according to one embodiment of the present invention.
Figure 3:
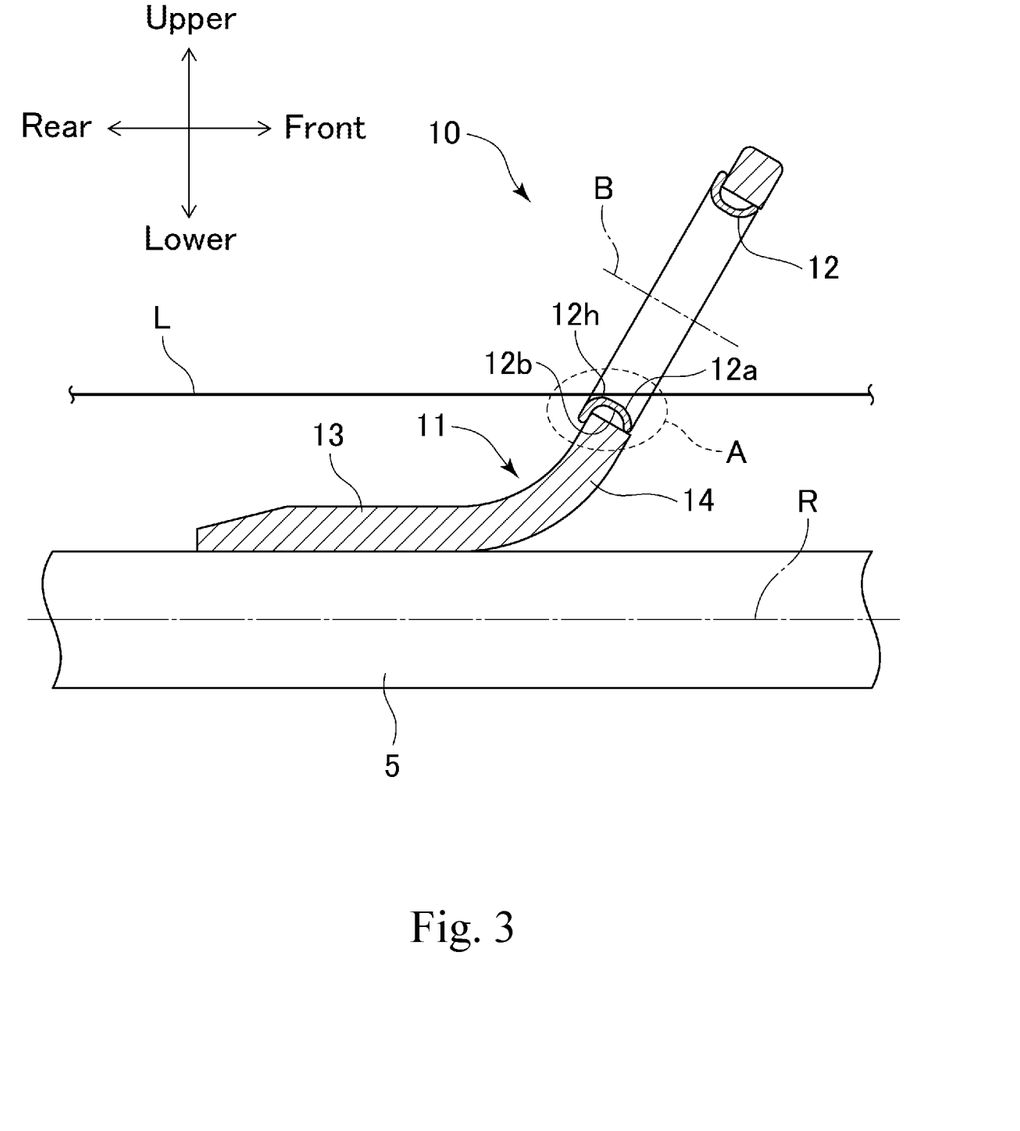
FIG. 3 is a longitudinal sectional view of the fishing line guide according to one embodiment of the present invention.
Figure 4:
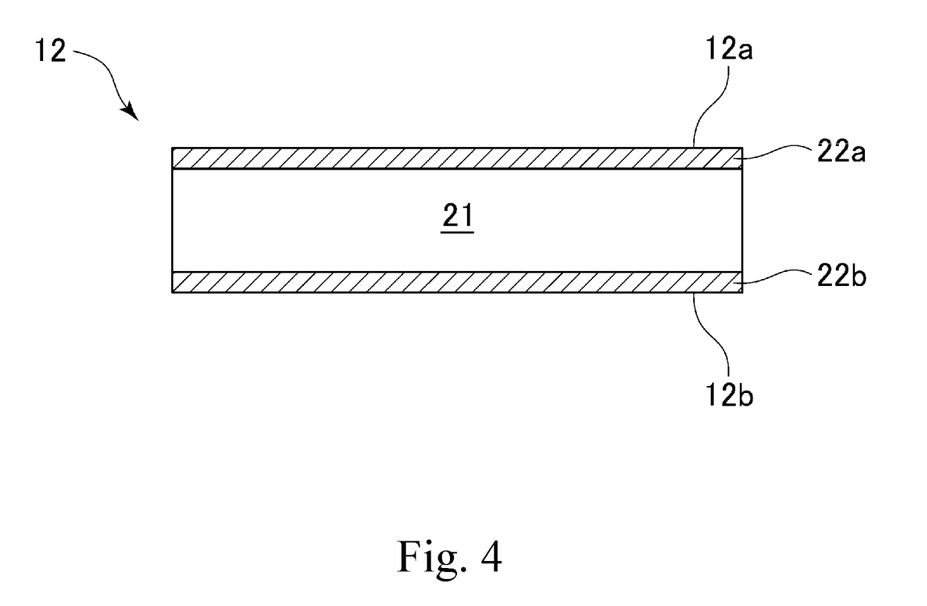
FIG. 4 is a view schematically showing a cross section of a guide ring of the fishing line guide according to one embodiment of the present invention.
Figure 5:
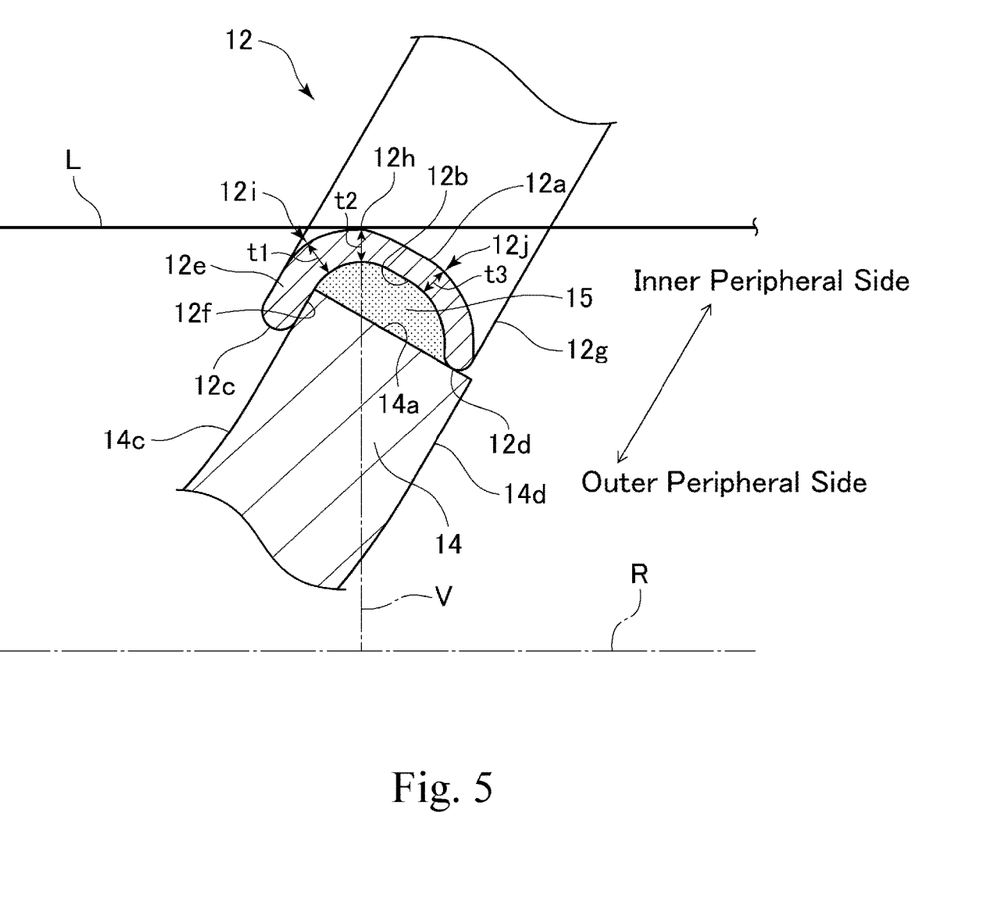
FIG. 5 is an enlarged longitudinal sectional view showing a part of the fishing line guide shown in FIG. 3.

With reference to FIGS. 2 to 5, a description is given of a fishing line guide according to one embodiment of the present invention. FIG. 2 is a front view of a fishing line guide 10 in one embodiment, and FIG. 3 is a longitudinal sectional view of the fishing line guide 10. FIG. 4 is a view schematically showing a cross section of a guide ring 12, and FIG. 5 is an enlarged longitudinal sectional view of a region in the vicinity of a lower end of the fishing line guide shown in FIG. 3 (a region enclosed by a dotted line A in FIG. 3).

As shown in the figures, the fishing line guide 10 includes a guide body 11 and a guide ring 12 having an annular shape and mounted to the guide body 11. The guide body 11 includes a foot portion 13 mounted to any of a rod element 3, a rod element 5, and a rod element 7 and a plate-shaped ring retaining portion 14 connected to the foot portion 13. For convenience of description, the following description is directed to an exemplary case where the fishing line guide 10 is mounted to the rod element 5.

In one embodiment of the present invention, the foot portion 13 is an elongated plate-shaped or tongue-shaped member extending along an outer peripheral surface of the rod element 5. The foot portion 13 is wound on the rod element 5 by use of, for example, a winding thread made of nylon fibers. While FIG. 2 illustratively shows a fishing line guide of a single-foot type having one foot portion used to mount the fishing line guide to a rod element, a guide ring to which the present invention is applicable is not limited to the single-foot type. For example, the present invention is also applicable to a guide ring of a double-foot type. A fishing line guide of the double foot type has a pair of foot portions extending from a ring retaining portion to a front side and a rear side, respectively, and this pair of foot portions is used to secure the fishing line guide to a rod element. Furthermore, the present invention is also applicable to both a stationary fishing line guide and a movable fishing line guide (which may be referred to as a free guide).

In one embodiment of the present invention, the ring retaining portion 14 extends from an upper end of the foot portion 13. The ring retaining portion 14 is inclined upward from the rear toward the front of the rod element 5. That is, with the guide ring 10 mounted to the rod element 5, the ring retaining portion 14 leans toward the front of the rod element 5. As shown in the figures, the ring retaining portion 14 has a through hole formed therein, the through hole piercing the ring retaining portion 14 generally in a front-rear direction of the rod element 5. This through hole is defined by an inner peripheral surface 14a of the ring retaining portion 14. The guide ring 12 is fitted in this through hole. While the ring retaining portion 14 is a generally flat plate-shaped member, a connection portion thereof connecting with the foot portion 13 is mildly curved as shown in FIG. 3. That is, the ring retaining portion 14 includes a flat portion and a curved portion; the flat portion is generally flat and has the through hole formed therein, the guide ring 10 being fitted in the through hole, and the curved portion is mildly curved and is connected to the foot portion 13.

The foot portion 13 and the ring retaining portion 14 can be integrally manufactured from a prepreg sheet. In manufacturing the foot portion 13 and the ring retaining portion 14, the first step is to press a plurality of prepreg sheets together and burn and hardening the pressed prepreg sheets, to thereby produce a shaped prepreg product. Next, a frame having a shape corresponding to the foot portion 13 and the ring retaining portion 14 is cut out of the shaped prepreg product. Thus, the obtained frame is an integrated piece of the foot portion 13 and the ring retaining portion 14. Detailed process steps for manufacturing a fishing line guide from prepreg sheets are described in, for example, International Application PCT/JP2012/079595 filed by the applicant of the present invention. The fishing line guide 10 can be manufactured by using any known technique other than the above. For example, the fishing line guide 10 can be formed by injection molding using a metal or a synthetic resin.

The annular guide ring 12 is fitted in the through hole of the ring retaining portion 14. As best shown in FIG. 3, the guide ring 12 has a ring inner peripheral surface 12a extending annularly in a circumferential direction of the guide ring 12 and a ring outer peripheral surface 12b extending substantially parallel to the ring inner peripheral surface 12a. The guide ring 12 is made of, for example, ceramic, a metal, an alloy, or a composite thereof.

With reference to FIG. 4, a further description is given of the guide ring 12. FIG. 4 shows a guide ring 12 made of a Co—Ni base alloy subjected to a surface treatment. As shown in the figure, the guide ring 12 has a base material layer 21, a surface layer 22a, and a surface layer 22b. The surface later 22a is formed on a surface of the base material layer 21 near the inner peripheral surface 12a, and the surface layer 22b is formed on a surface of the base material layer 21 near the outer peripheral surface 12b. In this specification of the present invention, the surface layer 22a and the surface layer 22b may be referred to collectively as a surface layer 22. The surface layer 22b arranged near the outer peripheral surface 12b can be omitted.

In one embodiment of the present invention, the base material layer 21 is made of, for example, a Co—Ni base alloy. The base material layer 21 is formed of, for example, an alloy containing Co, Ni, Cr, Mo, Fe, and inevitable impurities. The base material layer 21 may contain Mn, Ti, and/or Nb. In one embodiment of the present invention, the base material layer is constituted of, for example, 30 to 40 wt % Co, 27 to 37 wt % Ni, 12 to 25 wt % Cr, 5 to 10 wt % Mo, 3 wt % or less Fe, and a balance of inevitable impurities. Furthermore, in one embodiment of the present invention, the base material layer is made of, for example, SPRON 510 from Seiko Instruments Inc (SPRON is a registered trademark). In one embodiment of the present invention, the base material layer 21 has an Fe content of 3 wt % or less. In another embodiment of the present invention, the base material layer 21 has an Fe content of 2 wt % or less.

The surface layer 22 is formed of, for example, chromium carbide (CrC), titanium carbide (TiC), or vanadium carbide (VC). When formed of chromium carbide, the surface layer 22 is formed on the surface of the base material layer 21 by, for example, subjecting the base material layer 21 to a carburizing process in accordance with an ordinary method so that a carburization layer is formed thereon and then subjecting the base material layer with the carburization layer formed thereon to a chromium impregnation-diffusion process (a chromizing process). When formed of titanium carbide, the surface layer 22 is formed on the surface of the base material layer 21 by, for example, subjecting the base material layer 21 to the carburizing process in accordance with the ordinary method so that a carburization layer is formed thereon and next subjecting the base material layer with the carburization layer formed thereon to a titanium impregnation-diffusion process (a titanizing process). When formed of vanadium carbide, the surface layer 22 is formed on the surface of the base material layer 21 by, for example, subjecting the base material layer 21 to the carburizing process in accordance with the ordinary method so that a carburization layer is formed thereon and next subjecting the base material layer with the carburization layer formed thereon to a vanadium impregnation-diffusion process (a VC process). Examples of the carburizing process and the chromizing process are disclosed in, for example, Japanese Patent Application Publication No. 2014-238143. In a case where the surface layer 22 is formed of chromium carbide, a surface of the guide ring 12 has a hardness as high as a Vickers hardness of about 1,300 Hv to 1,800 Hv (preferably, a Vickers hardness of about 1,600 Hv to 1,800 HV). In a case where the surface layer 22 is formed of titanium carbide, the surface of the guide ring 12 has a hardness as high as a Vickers hardness of about 2,000 Hv to 3,000 Hv. In a case where the surface layer 22 is formed of vanadium carbide, the surface of the guide ring 12 has a hardness as high as a Vickers hardness of about 2,000 Hv to 3,000 Hv. Accordingly, it is unlikely that the guide ring 12 suffers from attrition due to contact with a fishing line L. Furthermore, the base material layer 21 is formed of an alloy having an Fe content of 3 wt % or less, and thus the guide ring 12 is extremely resistant to rust.

With reference to FIG. 5, a further description is given of the shape of the guide ring 12 and joining between the guide ring 12 and the ring retaining portion 14. As described above, the guide ring 12 has the ring inner peripheral surface 12a and the ring outer peripheral surface 12b. The ring inner peripheral surface 12a and the ring outer peripheral surface 12b are connected with each other at the rear end surface 12c and the front end surface 12d. The guide ring 12 has a top portion 12h that is most distant from the fishing rod 5 in a vertical direction V extending vertically with respect to the axial direction R of the fishing rod 5. In this specification, the portion of the guide ring 12 located on the rear side of the top portion 12h may be referred to as a guide rear portion 12i, and the portion of the guide ring 12 located on the front side of the top portion 12h may be referred to as a guide front portion 12j.

In one embodiment of the present invention, the thickness of the guide rear portion 12i is larger than that of the guide front portion 12j, as in FIG. 5 showing a sectional view of the guide ring 12 cut along a plane including the axial direction B of the guide ring 12. In FIG. 5, the thickness of the guide rear portion 12i is denoted by t1, and the thickness of the guide front portion 12j is denoted by t3. The guide rear portion 12i extends from the top portion 12h to the rear end surface 12c, and the thickness of the guide rear portion 12i of the guide ring 12 herein refers to the thickness of any portion of the guide rear portion 12i. In one embodiment, the thickness t1 of the guide rear portion 12i decreases from the rear end toward the top portion 12h. Accordingly, the thickness t2 at the top portion 12h is smaller than the thickness t1 of the guide rear portion 12*i*. Likewise, the guide front portion 12*j* extends from the top portion 12*h* to the front end surface 12*d*, and the thickness of the guide front portion 12*j* of the guide ring 12 herein refers to the thickness of any portion of the guide front portion 12*j*. In one embodiment, the thickness t3 of the guide front portion 12*j* decreases from the top portion 12*h* toward the front end. Accordingly, the thickness t3 of the guide front portion 12*j* is smaller than the thickness t2 at the top portion 12*h*.

In this specification, the thickness of the guide rear portion 12*i* being larger than that of the guide front portion 12*j* means any of the following: (1) the thickness of any portion of the guide rear portion 12*i* is larger than that of any portion of the guide front portion 12*j*, (2) the thickness of the thickest portion of the guide rear portion 12*i* is larger than that of the thickest portion of the guide front portion 12*j*, and (3) the average thickness of the guide rear portion 12*i* is larger than the average thickness of the guide front portion 12*j*.

Thus, the thickness of the guide rear portion 12*i* is larger than that of the guide front portion 12*j*, and therefore, the guide rear portion 12*i*, against which the fishing line collides at a high speed, can have a high impact resistance.

As shown, when the fishing line L is reeled in, the guide ring 12 contacts with the fishing line L in the vicinity of the top portion 12*h* of the ring inner peripheral surface 12*a*. Since the thickness t2 at the top portion 12*h* is larger than the thickness t3 of the guide front portion 12*j*, it is possible to inhibit the guide ring 12 from being broken due to wear.

The guide ring 12 is curved into a convex form toward an inner peripheral side (toward the inner peripheral surface 12*a*) as viewed in a cross section cut along a plane including an axial direction B of the guide ring 12. In one embodiment of the present invention, the guide ring 12 is formed and disposed so that a rear edge portion 12*e* thereof extends along a rear surface 14*c* of the ring retaining portion 14. In one embodiment, the guide ring 12 is formed and disposed so that a front surface 12*f* of the rear edge portion 12*e* thereof comes in contact with the rear surface 14*c* of the ring retaining portion 14. Thus, the guide ring 12 is more stably retained to the ring retaining portion 14.

In one embodiment, the guide ring 12 is formed and disposed so that a rear end surface 12*c* thereof is arranged on a rear side relative to the inner peripheral surface 14*a* of the ring retaining portion 14, while a front end surface 12*d* thereof comes in contact with the inner peripheral surface 14*a* of the ring retaining portion 14. Thus, when the guide ring 12 is fitted into the through hole of the ring retaining portion 14, the guide ring 12 makes contact at the end surface 12*d* thereof with the inner peripheral surface 14*a* of the ring retaining portion 14, so that a contact area between the guide ring 12 and the through hole of the ring retaining portion 14 is decreased. Accordingly, when the guide ring 12 is fitted into the through hole of the ring retaining portion 14, a large stress is prevented from being exerted on the guide ring 12.

In one embodiment, the guide ring 12 is formed and disposed so that a front end portion 12*g* thereof is flush with a front surface 14*d* of the ring retaining portion 14. In another embodiment, the guide ring 12 is formed and disposed so that the front end portion 12*g* thereof is arranged at a position somewhat retracted to a rear side in the axial direction B relative to the front surface 14*d*. Thus, it is unlikely that the fishing line L gets caught on the guide ring 12 at the front of the fishing line guide 10.

In one embodiment of the present invention, as shown in the figure, the guide ring 12 is formed and disposed so that a gap is formed between the outer peripheral surface 12*b* thereof and the inner peripheral surface 14*a* of the ring retaining portion 14. Any type of adhesive 15 may be applied in this gap. Thus, the guide ring 12 is more stably retained to the ring retaining portion 14.

In one embodiment of the present invention, when the fishing line L is under a tension (for example, at the time of winding the fishing line L), the guide ring 12 makes contact at a top portion 12*h* thereof with the fishing line L, the top portion 12*h* being on an uppermost side of the inner peripheral surface 12*a* of the guide ring 12. The guide ring 12 is formed and disposed so that a tangential direction of the top portion 12 is substantially the same as an extending direction of the fishing line L (substantially the same as a longitudinal direction of the rod element 5). Thus, at the time of winding the fishing line L, a friction force exerted on the fishing line L can be reduced.

Next, a description is given of a method for working the guide ring 12 in an exemplary case where the surface layer 22 is formed of chrome carbide. First, a guide ring base material is prepared. As the guide ring base material, the above-mentioned SPRON 510 manufactured by Seiko Instruments Inc. can be used. The guide ring base material is worked into a shape of a thin plate having a thickness of 0.1 cm to 0.3 cm. Next, the guide ring base material in the thin plate shape is heated to 900° C. to 1,000° C. so that the guide ring base material is softened. While being softened by this heating, the guide ring base material is worked, by pressing, from the thin plate shape into a ring shape shown in some of the figures such as FIG. 3. That is, the guide ring base material is worked such that its thickness is smaller from one end toward the other. More specifically, the guide ring base material is worked such that when the guide ring is mounted to the guide body, the thickness of the guide rear portion on the rear side relative to the top portion is larger than the thickness of the guide front portion on the front side relative to the top portion.

Next, the guide ring base material thus worked into the ring shape is subjected to a carburizing process in accordance with an ordinary method. For example, in a case of adopting pack carburizing in the carburizing process, the carburizing process is performed by generally following procedures described below. First, a carburizing box packed with a carburizing material primarily composed of charcoal is prepared. Next, the guide ring base material is buried in this carburizing box, which then is hermetically sealed. Next, the guide ring base material, together with the carburizing box, is heated at, for example, about 900° C. to 1,200° C. for a predetermined time. After being heated, the guide ring base material is cooled and then is taken out. Thus, a carburization layer is formed on a surface of the guide ring base material. In the present invention, liquid carburizing, gas carburizing, or vacuum carburizing may be used in place of the pack carburizing.

Next, the guide ring base material with the carburization layer formed thereon is subjected to a chromizing process in accordance with an ordinary method. The chromizing process is performed by generally following procedures described below. First, a process box packed with a preparation composed of a chromium powder, an aluminum oxide powder, and an ammonium chloride powder is prepared Next, the guide ring base material with the carburization layer formed thereon is buried in this process box, which then is hermetically sealed. Next, the guide ring base material, together with the process box, is heated at, for example, about 900° C. to 1,200° C. for a predetermined time and then is cooled. Thus, a chromium carbide (CrC) layer having a thickness of about 10 μm to 30 μm is formed on the surface of the guide ring base material. In this manner, there is obtained a guide ring having a surface with the chromium carbide layer formed thereon. The guide ring is subjected to a predetermined cleaning process. Furthermore, the guide ring is polished using a barrel polisher so that the guide ring has predetermined dimensions and a predetermined surface roughness.

Figure 6:
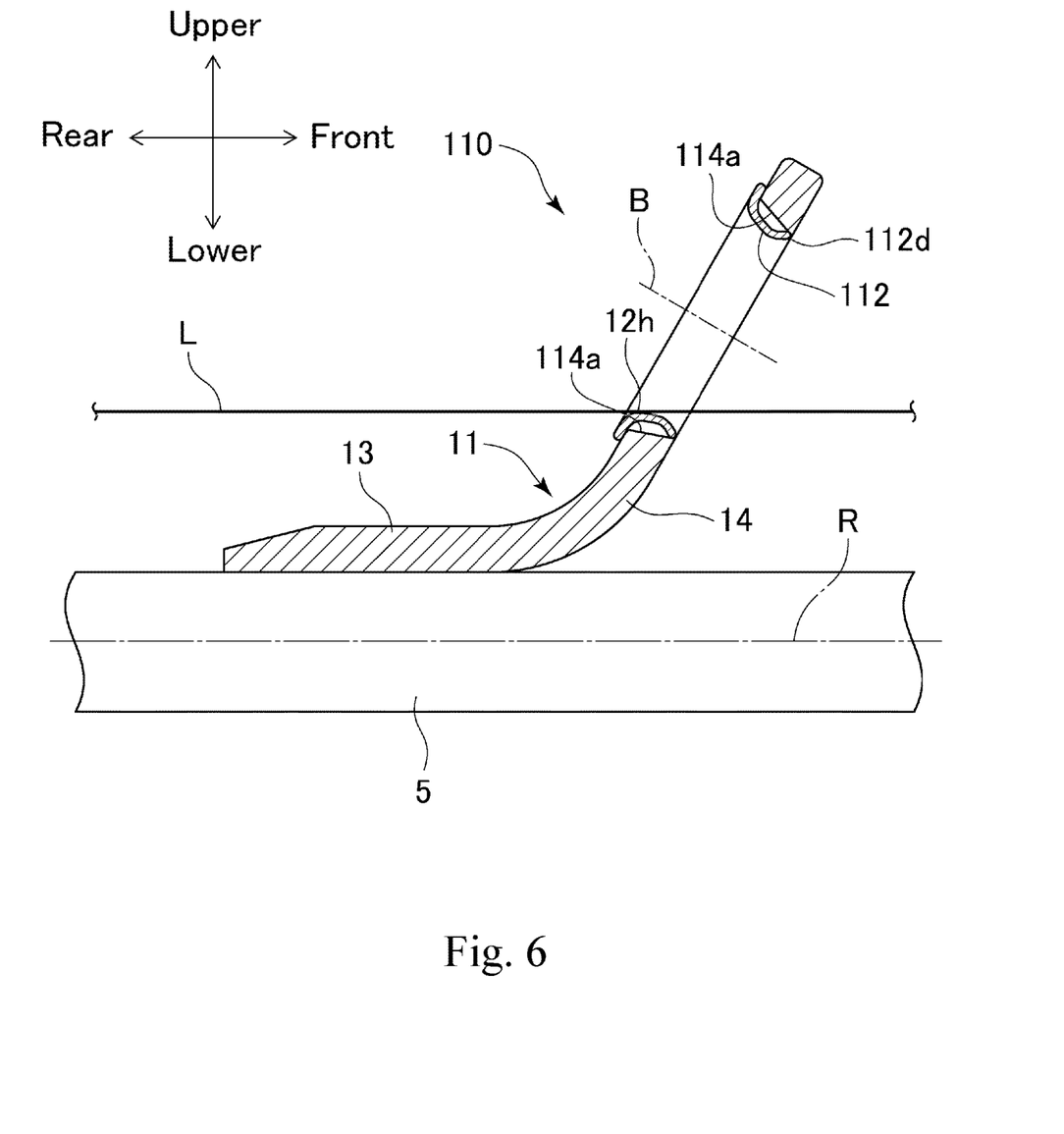
FIG. 6 is a longitudinal sectional view of the fishing line guide according to one embodiment of the present invention.

With reference to FIG. 6, a description is given of a fishing line guide according to another embodiment of the present invention. A fishing line guide 110 according to another embodiment of the present invention shown in FIG. 6 is different from the fishing line guide 10 in terms of the shape of an inner peripheral surface of a ring retaining portion and the shape of a guide ring. As shown in FIG. 6, an inner peripheral surface 114a of the fishing line guide 110 is formed so as to be inclined with respect to an axis B. Therefore, a through hole of a ring retaining portion 14, which is defined by the inner peripheral surface 114a, has a diameter decreasing from a rear side toward a front side of the axis B. That is, the through hole of the ring retaining portion 14 of the fishing line guide 110 has a diameter increased on the rear side and decreased on the front side. A guide ring 112 is formed and disposed so that a front end surface 112d thereof comes in contact with the inner peripheral surface 114a in the vicinity of a front end thereof. Therefore, according to the embodiment shown in FIG. 6, the guide ring 112 is fitted from the rear side toward the front side into the through hole of the ring retaining portion 14, and thus the guide ring 112 can be smoothly fitted into the through hole of the guide retaining portion 14.

Figure 7:
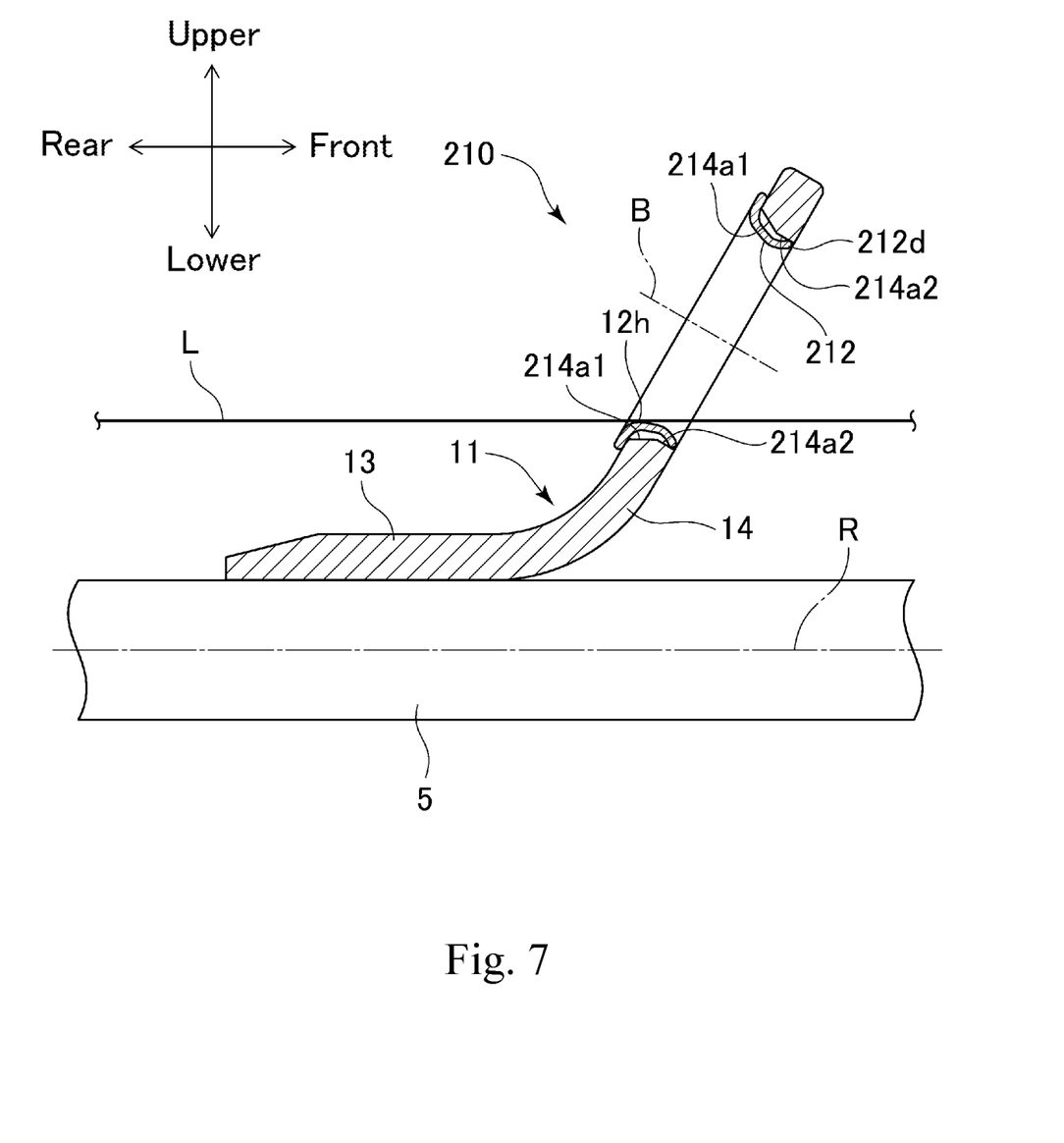
FIG. 7 is a longitudinal sectional view of the fishing line guide according to one embodiment of the present invention.

With reference to FIG. 7, a description is given of a fishing line guide according to another embodiment of the present invention. A fishing line guide 210 according to another embodiment of the present invention shown in FIG. 7 is different from the fishing line guide 10 in terms of the shape of an inner peripheral surface of a ring retaining portion and the shape of a guide ring. As shown in FIG. 7, an inner peripheral surface 214a of the fishing line guide 210 has an inclined portion 214a1 extending so as to be inclined with respect to an axis B and a small diameter portion 214a2 extending parallel to the axis B from a front end of the inclined portion 214a1. The small diameter portion 214a2 has a diameter smaller than that of the inclined portion 214a1. A guide ring 212 is formed and disposed so that a front end surface 212d thereof comes in contact with the small diameter portion 214a2. Therefore, according to the embodiment shown in FIG. 7, the guide ring 212 is fitted from the rear side toward the front side into the through hole of the ring retaining portion 14, and thus the guide ring 212 can be smoothly fitted into the through hole of the guide retaining portion 14. Furthermore, according to the embodiment shown in FIG. 7, the guide ring 212 can be stably retained by the small diameter portion 214a2.

The dimensions, materials, and arrangements of the various constituents described in this specification are not limited to those explicitly described for the embodiments, and the various constituents can be modified to have any dimensions, materials, and arrangements within the scope of the present invention. Constituents other than those explicitly described herein can be added to the described embodiments; and part of the constituents described for the embodiments can be omitted.

LIST OF REFERENCE NUMBERS 1 fishing rod
3, 5, 7 rod element
10 fishing line guide
11 guide body
12 guide ring
13 foot portion
14 ring retaining portion
12h guide top portion
12i guide rear portion
12j guide front portion
L fishing line

What is claimed is:

1. A fishing line guide to be mounted to a fishing rod, comprising:
   a guide body with a through hole formed therein; and
   a guide ring fitted into the through hole of the guide body,
   wherein the guide ring has a top portion that is most distant from the fishing rod in a vertical direction extending vertically with respect to an axial direction of the fishing rod,
   the guide ring is configured such that a thickness between an outer peripheral surface and an inner peripheral surface of a guide rear portion on a rear side relative to the top portion is larger than that of a guide front portion on a front side relative to the top portion,
   the guide ring is curved so that a gap is formed between the outer peripheral surface of the guide ring and an inner peripheral surface of the guide body, and the fishing line guide further comprises an adhesive arranged in the gap,
   the through hole is defined by the inner peripheral surface of the guide body,
   the inner peripheral surface has an inclined portion and a small diameter portion, the inclined portion extending so as to be inclined with respect to an axis of the guide ring, the small diameter portion extending parallel to the axis,
   the inclined portion is formed such that the through hole has a diameter decreasing frontward,
   the small diameter portion has a diameter smaller than that of the inclined portion, and
   the guide ring is fitted into the through hole such that a front end surface thereof comes in contact with the small diameter portion.

2. The fishing line guide according to claim 1, wherein the guide ring is configured such that the thickness of the guide rear portion is larger than that of the top portion.

3. The fishing line guide according to claim 1, wherein the guide ring is configured such that the thickness of the top portion is larger than that of the guide front portion.

4. The fishing line guide according to claim 1, wherein the guide ring is curved so that a front surface of a rear edge portion thereof comes in contact with a rear surface of the guide body.

5. The fishing line guide according to claim 1, wherein the guide ring is curved so as to come in contact at a front end surface thereof with the inner peripheral surface of the through hole of the guide body.

6. A fishing rod comprising at least one fishing guide line as claimed in claim 1.

7. A guide ring for use in a fishing line guide to be mounted to a fishing rod, the guide ring comprising:
   a top portion that is most distant from the fishing rod in a vertical direction extending vertically with respect to an axial direction of the fishing rod,
   wherein the guide ring is configured such that a thickness between an outer peripheral surface and an inner peripheral surface of a guide rear portion on a rear side relative to the top portion is larger than that of a guide front portion on a front side relative to the top portion, the guide ring is curved so that a gap is formed between an outer peripheral surface of the guide ring and an inner peripheral surface of a guide body, and an adhesive is arranged in the gap, the through hole is defined by the inner peripheral surface of the guide body, the inner peripheral surface has an inclined portion and a small diameter portion, the inclined portion extending so as to be inclined with respect to an axis of the guide ring, the small diameter portion extending parallel to the axis, the inclined portion is formed such that the through hole has a diameter decreasing frontward, the small diameter portion has a diameter smaller than that of the inclined portion, and the guide ring is fitted into the through hole such that a front end surface thereof comes in contact with the small diameter portion.

* * * * *